United States Patent [19]

Brown

[11] 4,070,956

[45] Jan. 31, 1978

[54] COFFEEMAKER WITH BREWING WATER SPREADER

[75] Inventor: Richard N. Brown, Macungie, Pa.

[73] Assignee: General Electric Company, Bridgeport, Conn.

[21] Appl. No.: 704,348

[22] Filed: July 12, 1976

[51] Int. Cl.² .................. A47J 31/057; A47J 31/44
[52] U.S. Cl. .................................. 99/304; 99/323.3; 99/315
[58] Field of Search .................. 99/304–307, 99/311, 323.3, 280–283, 302, 315, 279, 312, 314

[56] References Cited

U.S. PATENT DOCUMENTS

| | | | |
|---|---|---|---|
| 367,240 | 7/1887 | Salmon | 99/305 |
| 1,613,483 | 1/1927 | Richheimer | 99/306 |
| 1,736,265 | 11/1929 | Kelly | 99/315 |
| 2,309,526 | 1/1943 | Moore | 99/306 |
| 2,780,162 | 2/1957 | Chaplik | 99/315 |
| 2,948,618 | 8/1960 | Saint | 426/433 |
| 3,361,052 | 1/1968 | Weber | 99/302 R |
| 3,374,897 | 3/1968 | Martin | 99/315 |
| 3,385,201 | 5/1968 | Martin | 99/282 |
| 3,444,804 | 5/1969 | Strozek | 99/302 |
| 3,793,933 | 11/1971 | Weber | 99/283 |
| 3,878,772 | 4/1975 | Nordskog | 99/306 |
| 3,908,530 | 9/1975 | Simon | 99/307 |

*Primary Examiner*—Leonard D. Christian
*Attorney, Agent, or Firm*—John F. Cullen; George R. Powers; Leonard J. Platt

[57] ABSTRACT

A coffeemaker having a ground coffee basket and a heated brewing water spreader positioned generally above the ground coffee basket wherein the spreader includes a generally vertical cylindrical dam wall extending upwardly from a generally flat foraminous wall for permitting brewing water to flow over the dam wall, through an overflow passage and into the ground coffee basket when the spreader has been filled with heated brewing water above the upper surface of the dam wall.

5 Claims, 7 Drawing Figures

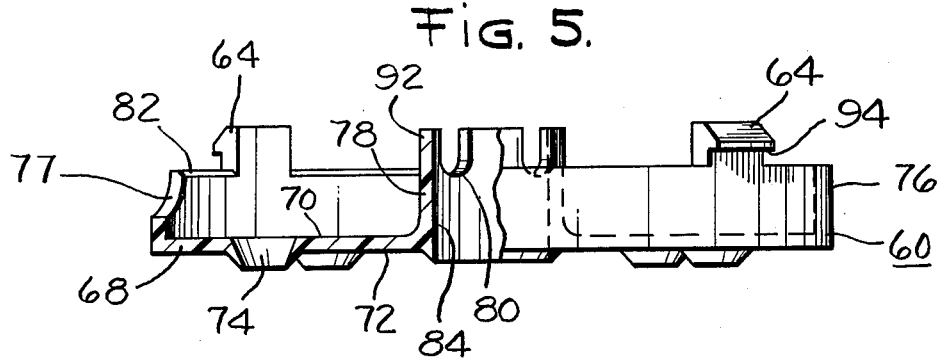
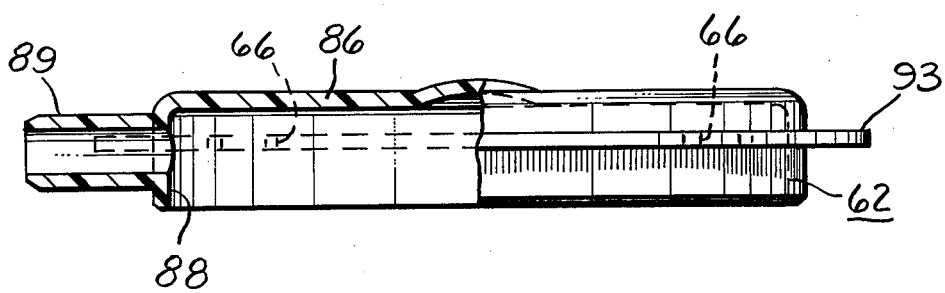
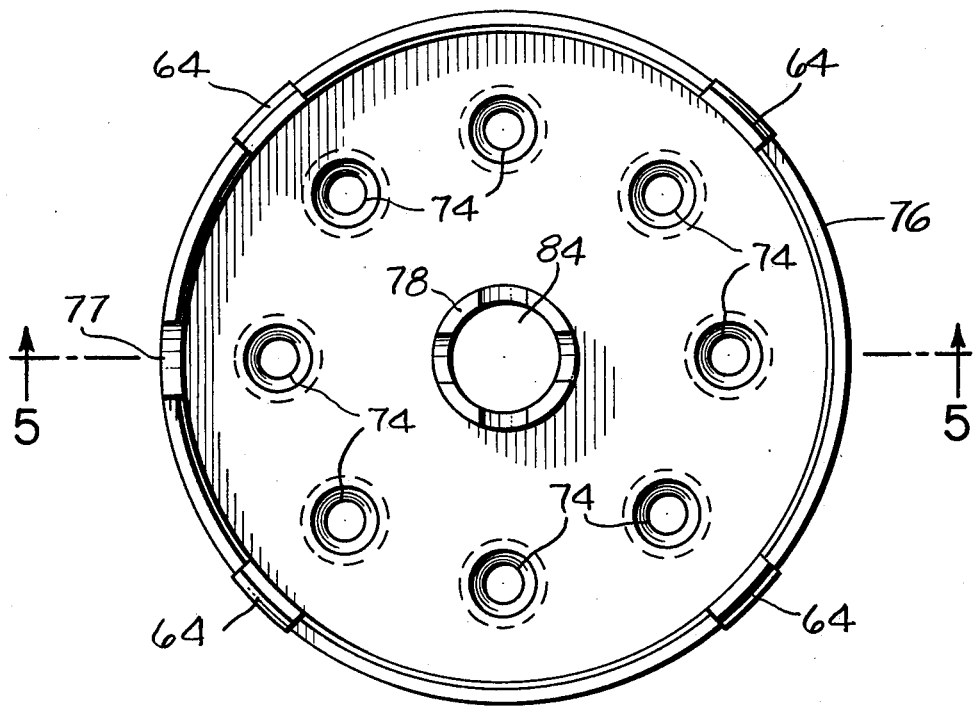

COFFEEMAKER WITH BREWING WATER SPREADER

BACKGROUND OF THE INVENTION

1. Field of the Invention

This invention relates to a coffeemaker and, more particularly, to an improved brewing water spreader for dispersing heated brewing water into a ground coffee basket.

2. Description of the Prior Art

In the manufacture of electric coffeemakers, it is conventional to provide a heated brewing water spreader having a plurality of apertures in order to uniformly distribute brewing water into coffee grounds. In some constructions, the spreader takes the form of a spreader plate that is attached to a ground coffee basket and in other constructions as shown in a prior U.S. Pat. No. 3,385,201, to Martin dated May 28, 1968, the water spreading function is achieved by a "discharge head 28 which is arranged to spray hot water over ground coffee 29" in a cup-shaped member 30.

In prior U.S. Pat. No. 3,793,933, to Weber dated Feb. 26, 1974, "a water spreader plate 257 . . . is a metal disc carrying perforations spread over the entire area of infusion."

A U.S. Pat. No. 3,908,530, to Simon dated Sept. 30, 1975, discloses a water spreader plate 41 that is inserted within a ground coffee basket 40. The spreader plate has "a plurality of arcuately shaped slots located in the surface of the spreader plate evenly spaced so as to provide uniform distribution of the brewing water into the coffee grounds". "In order to complete brewing in maximum time limit a bypass is provided comprising an overflow 50 in the center of the spreader plate having a conically shaped opening 51" for bypassing heated brewing water through a tube 55. In this construction, the bypassed brewing water cannot flow through the coffee grounds within the coffee basket 40.

In a prior U.S. Pat. No. 3,444,804, to Stozek dated May 20, 1969, there is disclosed a brewing water "pressure chamber" having an upper wall 25 provided with an inlet 27 and a lower foraminous wall 26.

This invention is concerned with such electric coffeemaker water spreader constructions, and particularly to an improved readily manufactured construction that disperses all of the heated brewing water to the coffee grounds without becoming pressurized, and which is also constructed so that it does not have to be removed from the coffeemaker when the coffee grounds basket is refilled with dry ground coffee.

Accordingly, it is a primary object of my invention to provide an improved brewing water spreader which may be located above a coffee grounds basket without being physically attached to the basket so that the basket may be refilled with ground coffee without moving the spreader.

It is a further object of my invention to provide a brewing water spreader which distributes all of the brewing water which may be delivered to it to the coffee even though the rate of flow of brewing water to the spreader may be increased or one or more of the apertures in the spreader may become clogged.

It is a further object of my invention to provide a brewing water spreader having relatively few parts which may be readily manufactured at relatively low cost and readily connected to each other and to a drip coffeemaker housing.

SUMMARY OF THE INVENTION

In accordance with one of the aspects of this invention, an electric coffeemaker includes a means for heating brewing water and a ground coffee basket for receiving dry ground coffee and the heated brewing water. A heated water spreader is positioned generally above the ground coffee basket for receiving the heated brewing water from the heating means and for evenly distributing the heated water into the ground coffee basket. The spreader is constructed to include a bottom wall having an upper surface and lower surface with a plurality of holes extending through the bottom wall for dispersing water into the ground coffee basket. An enlarged overflow passage is formed in the bottom wall of the spreader. The passage includes a generally vertical dam wall extending upwardly from the upper surface of the bottom wall for permitting heated brewing water to flow over the dam wall through the overflow passage and into the ground coffee basket when the spreader has been filled with heated brewing water above the upper surface of the dam wall.

With this unique simplified construction, the spreader may be completely enclosed with a cover without becoming pressurized in the event that the rate of flow of brewing water to the spreader exceeds the rate of discharge through the plurality of holes that are formed in the bottom wall of the spreader. Thus, should the holes become clogged or should the rate of flow to the spreader increase, the brewing water would simply flow through the overflow passage and into the coffee grounds without damaging the spreader or other portions of the coffeemaker.

Moreover, with my unique spreader cover and overflow construction the spreader may be conveniently housed in a forwardly extending upper wall of the drip coffeemaker for permitting a ground coffee basket to be readily removed from the coffeemaker without also removing the brewing water spreader.

With this construction, both the spreader cover and the spreader bottom wall may be readily formed of low-cost plastic and uniquely connected to each other and to the forwardly extending upper portion of a drip coffeemaker in accordance with another aspect of my invention without the use of any additional parts. Thus, an exceedingly simple yet effective and reliable coffeemaker heated water spreader construction has been achieved.

BRIEF DESCRIPTION OF THE DRAWINGS

Other objects and attendant advantages of the invention will be apparent from the following descriptions taken in connection with the accompanying drawing in which:

FIG. 5 is an enlarged side elevational view taken on the line 5—5 of FIG. 7 and showing the bottom portion of the spreader illustrated in FIG. 3, partly in cross-section for showing details of the spreader bottom;

FIG. 6 is a cross-sectional view of a top cover portion of the spreader illustrated in FIG. 3; and FIG. 7 is an enlarged bottom plan view of the spreader illustrated in FIG. 5.

DESCRIPTION OF THE PREFERRED EMBODIMENT

Figure 1:
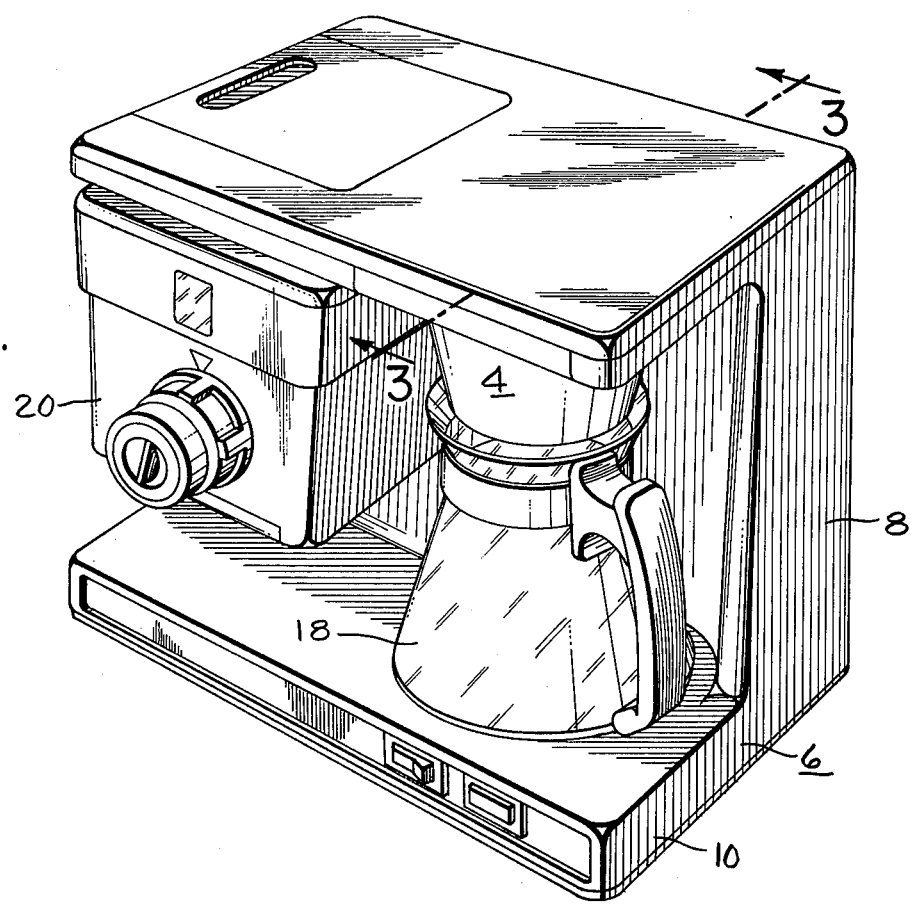
FIG. 1 is a front perspective view of an electric coffeemaker which includes a brewing water spreader constructed in accordance with my invention.
Figure 2:
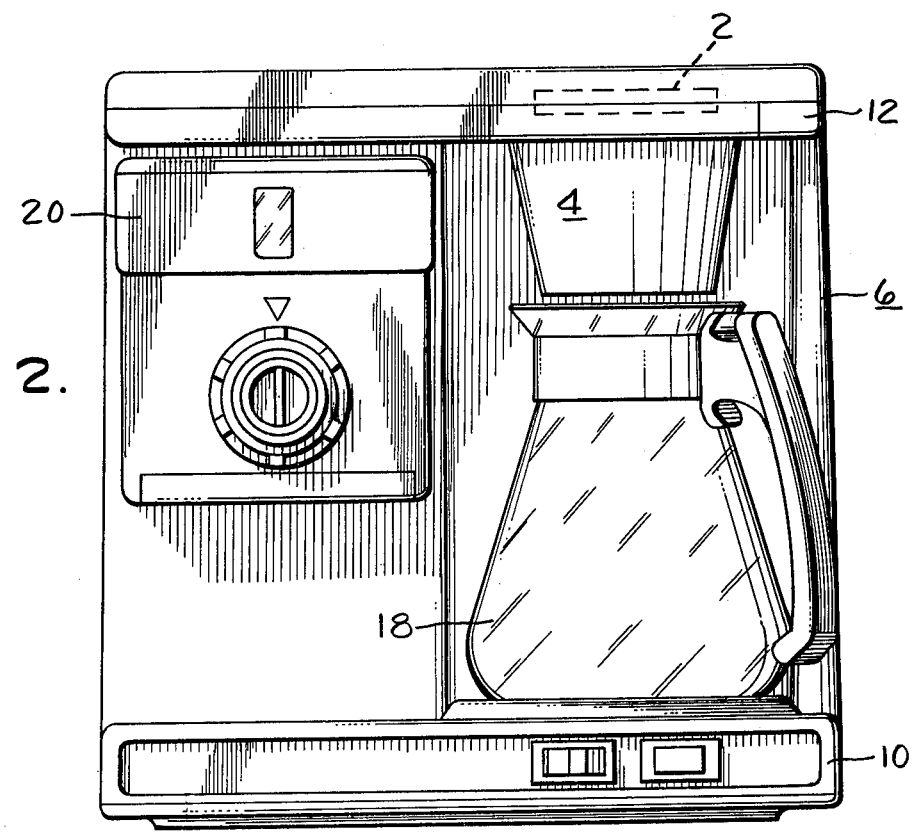
FIG. 2 is a front elevational view of the coffeemaker illustrated in FIG. 1.
Figure 3:
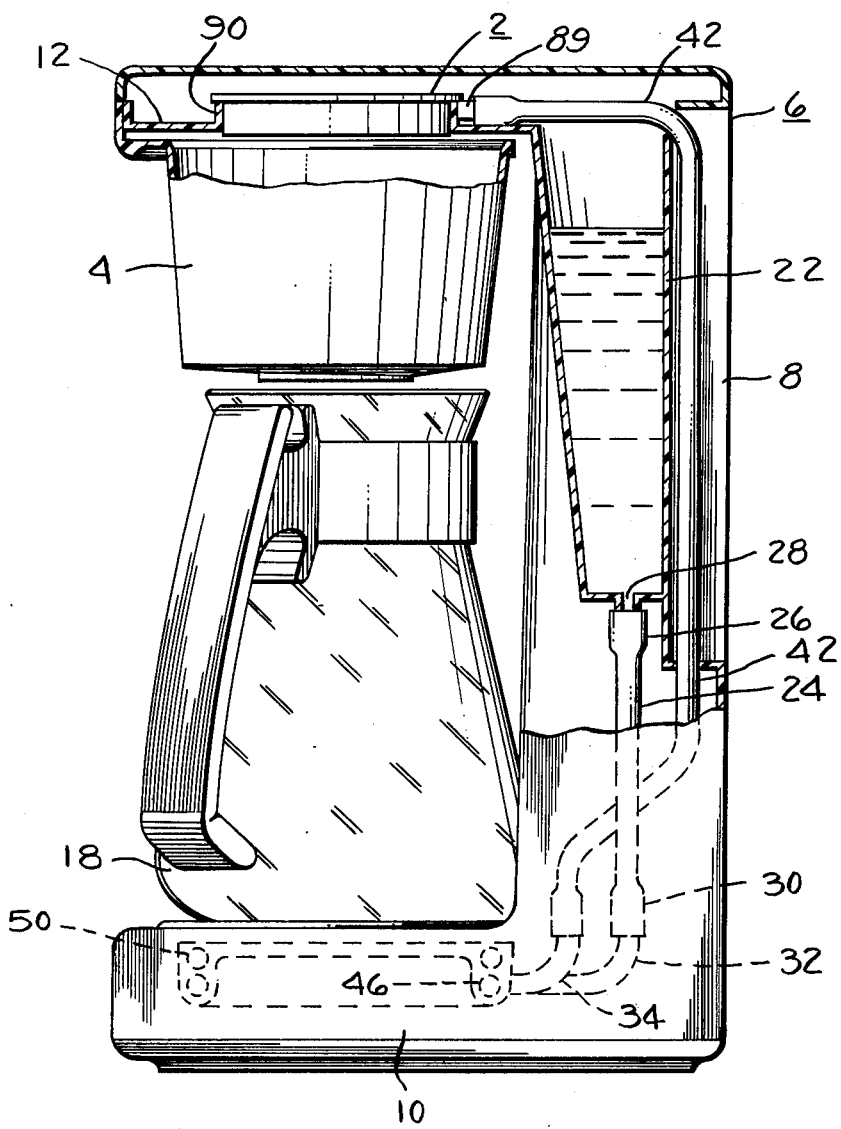
FIG. 3 is a right side elevational view along line 3—3 of the coffeemaker illustrated in FIG. 1 having portions broken away and other portions shown in section for illustrating the water flow path within the coffeemaker to my improved spreader.

Referring now to the drawing and first particularly to FIGS. 1 and 3, there is shown an electric drip coffeemaker which includes my unique spreader 2 for evenly dispersing heated brewing water through coffee grounds that may be located in a coffee basket 4. As shown, the coffeemaker includes a housing 6 having a generally hollow rear wall 8 and a hollow stand portion 10. An overhanging hollow top wall 12 extends forwardly from the upper portion of the rear wall for holding my improved water spreader 2. A carafe 18 is suitably supported on the horizontal stand portion 10 of the coffeemaker for receiving the brewed coffee from the coffee basket 4.

The coffee basket 4 may be selectively positioned below a dispenser 20 or above the carafe 18 on guide rails that are formed at the bottom of the dispenser 20 and at the top wall of the coffeemaker. Thus, the basket 4 may be readily moved from its position below the dispenser 20 by simply pulling it forwardly from the dispenser, transporting it upwardly to the right, and then pushing it rearwardly onto the guide rails in the overhanging wall 12 of the coffeemaker.

The overall construction of the electric coffeemaker including the arrangement for supporting the coffee basket 4 on the coffeemaker, the carafe 18, and the overall housing do not form a part of this invention and are described and illustrated in greater detail in my U.S. Pat. No. 3,968,740 of July 13, 1976 of common assignment.

WATER FLOW PATH

As shown more particularly in FIG. 3, a water reservoir 22 may be integrally formed in the hollow rear wall of the coffeemaker for supplying water to a water heater 46 and then to my improved water spreader 2. As shown, a flexible conduit 24 may be connected at one end 26 to an outlet 28 from the water reservoir and at its other end 30 to an inlet 32 of a water heater tube 46. An outlet 34 from the tube 46 extends upwardly to the left of the heater tube inlet 32 and a piece of flexible tubing 42 extends from the heated water outlet 34 upwardly behind the water reservoir 22 and is connected at its upper end portion to my improved water spreader 2.

A sheathed electric resistance heater 50 is positioned above the water tube 46 for heating water in the tube and for maintaining an appropriate temperature for any brewed coffee that may be in carafe 18. The electrical heater construction for heating brewing water and for keeping the coffee warm after it has been brewed does not form a part of this invention and is described and illustrated in greater detail in my copending application, Ser. No. 702,577 filed July 6, 1976, assigned to the same assignee as the present invention.

WATER SPREADER

In accordance with a preferred embodiment of this invention, my improved water spreader 2 is uniquely constructed for receiving heated brewing water from the heated water generator 46 through tube 42 without becoming pressurized, and for evenly distributing the heated water through the coffee grounds in basket 4. As shown more particularly in FIGS. 3, 5, and 6, the spreader itself consists of two parts, a spreader bottom 60 as shown in FIG. 5 and a spreader top 62 as shown in FIG. 6. The two pieces are uniquely snap-locked together by means of integrally molded snap tabs 64 that are formed on the spreader bottom that lock above corresponding slots 66 that are formed in the spreader top as shown more particularly in FIG. 4.

The spreader bottom 60 includes a bottom wall 68 having a generally flat upper surface 70 and a generally flat lower surface 72. A plurality of heated water openings 74 extend through the bottom wall for dispersing heated water into the ground coffee basket 4. As shown more particularly in FIG. 5, the spreader bottom also includes a generally cylindrical vertical side wall 76 with an arcuate cutout 77 for suitably confining heated water within the spreader.

In accordance with my invention, a unique overflow passage and spacer construction is centrally positioned on the spreader bottom for making sure that the heated water that is delivered to the spreader flows through the coffee grounds. As shown more particularly in FIG. 5, the overflow passage is provided by a generally vertical cylindrical dam wall 78 that is centrally positioned on the spreader bottom. The generally cylindrical wall 78 extends upwardly from the bottom wall 68 of the spreader and has an upper surface 80 that is effectively lower when closed as in FIG. 3 than the upper surface 82 of the generally cylindrical side wall 76 of the spreader bottom. Thus, should the rate of flow of heated water into the spreader be greater than the rate of flow through openings 74, heated water will rise within the spreader bottom and flow over the upper surface 80 of the dam wall outwardly through overflow passage 84 and into the coffee brewing basket 4. By this construction, water is prevented from overflowing the side wall 76 of the spreader in order to protect the internal parts of the coffeemaker that are located within the hollow rear wall 8 and stand portion 10 of the coffeemaker.

Figure 4:
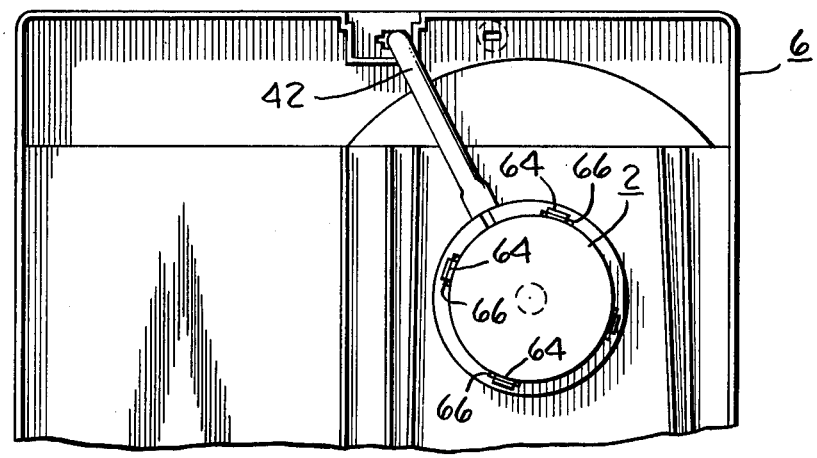
FIG. 4 is a top plan view of the coffeemaker illustrated in FIG. 1 with a top cover wall removed and other portions broken away for illustrating my improved brewing water spreader.

As shown more particularly in FIGS. 4 and 6, the spreader top 62 may be integrally molded to include an upper generally flat disc wall 86, a downwardly extending generally cylindrical side wall 88, a plurality of slots 66 for receiving the snap tab hooks 64 that may be integrally molded with the spreader bottom, and an integrally molded nipple 89 for connection with the heated water tube 42. The vertical cylindrical wall 88 is constructed to be complementary to the vertical cylindrical side wall 76 of the spreader bottom, and its diameter is slightly smaller than the vertical cylindrical wall 76 of the spreader bottom so that it may fit rather tightly within the inside surface of the spreader bottom cylindrical wall 76 in order to minimize leakage as water is pumped into the spreader through nipple 89 of the spreader top, the nipple fitting arcuate cutout 77 and extending thru a suitable slotted portion in overhanging housing wall 12. The spreader is assembled by pressing spreader top 62 down onto spreader bottom 60 whereupon the tabs 64 pass through matching slots 66 to lock the parts together as shown in FIG. 4.

In accordance with my invention, the vertical cylindrical dam wall 78 of the spreader bottom is provided with a plurality of generally vertical tabs 92 for engaging the disc wall 86 of the top cover in order to suitably space the top cover of the spreader from the bottom wall of the spreader.

My unique spreader has also been constructed so that it may be readily assembled and connected to the overhanging hollow top wall 12 of the coffeemaker without the use of any additional parts. As shown more particularly in FIG. 3, the overhanging hollow top wall 12 is provided with a generally vertical cylindrical wall 90 for receiving the outside cylindrical wall 76 of the spreader bottom and the spreader top is provided with an outwardly extending annular flange 93 for cooperation with both the upper surface of the vertical cylindrical wall 90 of the overhanging hollow top wall 12 and the upper surface 82 of the cylindrical wall 76 of the spreader bottom. With this unique construction, the spreader top 62 may be readily connected to the spreader bottom by simply passing the snap tabs 64 of the spreader bottom through the slots 66 of the spreader top and pressing the spreader top downwardly until the lower surface of flange 93 abuts the upper surface of cylindrical wall 76. When the walls are placed in abutting relationship, the snap tabs 64 will snap outwardly so that their overhanging portions 94 will be moved on top of the flange 93 of the spreader top in order to suitably hold the parts in assembled relationship. In order to connect the spreader to the overhanging top wall 12 of the coffeemaker, the assembled spreader is simply placed within the generally cylindrical wall 90 and moved downwardly until the lower surface of flange 93 is moved into contact with the upper surface of the cylindrical wall 90 of the overhanging wall 12.

OPERATION

In operation, it can be appreciated that water may be poured into the water reservoir 22 and an appropriate amount of ground coffee may be placed within the ground coffee basket 4. Water from the reservoir 22 will flow into the water heater 46 and then upwardly through tube 42 to the spreader 2. The water delivered to my unique spreader 2 will be delivered to the coffee grounds through the apertures 74 that are formed in the bottom wall of the spreader. Should any of the apertures 74 become clogged or should the rate of flow of heated water into the spreader exceed the rate of flow through the apertures 74, the water will rise in the spreader up to the level of the upper surface 80 of the dam wall 78 and then flow outwardly through the overflow passage 84 to the coffee grounds within the basket 4 without pressurizing the spreader and causing it to overflow over its outside walls.

It can also be appreciated that the parts are constructed so that the spreader 2 is almost totally positioned within the upstanding vertical cylindrical wall 90 of the overhanging wall 12 of the coffeemaker. With this construction, any slight leakage or condensation from the spreader 2 will be confined within the cylindrical wall 90 and the coffeemaker basket 4 so that it cannot flow downwardly along the inside of the coffeemaker through the hollow rear wall 8 and the bottom stand wall 10 where it could cause damage to the internal parts of the coffeemaker.

In view of the foregoing, it can also be appreciated that my improved water spreader may be readily formed and manufactured at relatively low cost. The apertures 74, side wall 76, vertical dam wall 78, vertical tabs 92, and the hooks 64 of the spreader bottom may all be integrally formed with the spreader bottom as the spreader bottom is molded. Likewise, all of the parts of the spreader top may be integrally formed while the spreader top is being molded, and naturally the vertical wall 90 may be integrally formed during the molding of the overhanging wall 12 of the coffeemaker. Thus, an exceedingly simple and reliable improved water spreader for effectively dispersing brewing water into the coffee basket 4 without becoming pressurized has been achieved at relatively low manufacturing cost.

What I claim is:

1. An electric coffeemaker comprising:
   a. means for heating water;
   b. a ground coffee basket for receiving dry ground coffee and heated brewing water;
   c. a heated water spreader positioned generally above said ground coffee basket for receiving heated brewing water from said heating means and for distributing heated water into the ground coffee basket;
   d. said spreader including a bottom wall having an upper surface and a lower surface and a cylindrical vertical side wall and a top cover; said side wall having a plurality of generally vertical tabs engaging and spacing the cover from the bottom wall of said spreader;
   e. a plurality of heated water openings extending through said bottom wall for distributing water into the ground coffee basket; and
   f. an enlarged overflow passage formed in the bottom wall of said spreader, said passage including a generally vertical dam wall formed with and extending upwardly from the upper surface of said bottom wall as a generally vertical cylindrical wall for permitting heated brewing water to flow over the dam wall through the overflow passage and into the ground coffee basket when the spreader has been filled with heated brewing water above the dam wall.

2. An electric coffeemaker as defined in claim 1 wherein the top cover of the spreader includes a downwardly extending generally cylindrical wall for insertion within the spreader bottom and an outwardly extending annular flange having a plurality of slots for cooperation with the upper surface of the side wall of the spreader bottom.

3. An electric coffeemaker comprising:
   a. means for heating water;
   b. a ground coffee basket for receiving dry ground coffee and heated brewing water;
   c. a heated water spreader positioned generally above said ground coffee basket for receiving heated brewing water from said heating means and for distributing heating water into the ground coffee basket;
   d. said spreader including a bottom portion having a bottom wall and upwardly extending side wall means;
   e. said spreader including a top cover having a plurality of slots formed therein; and
   f. a plurality of snap tabs integrally formed with the side wall means of the spreader bottom portion for insertion within the plurality of slots of the spreader top cover so that the spreader top cover may be readily connected to the spreader bottom by passing the snap tabs of the spreader bottom into the slots of the spreader top and pressing the spreader top downwardly until the snap tabs snap outwardly over the top in order to suitably hold the parts in assembled relationship.

4. An electric coffeemaker comprising:
a. a housing having a hollow generally vertical rear wall, a generally horizontal stand portion extending outwardly from a lower portion of said rear wall, and an overhanging wall extending outwardly from an upper portion of the vertical rear wall;
b. a means for heating water positioned within said housing;
c. a ground coffee basket for receiving dry ground coffee and heated brewing water positioned generally below said overhanging wall;
d. a heated water spreader positioned generally above said ground coffee basket for receiving heated brewing water from said heating means and for distributing heated water into the ground coffee basket;
e. said spreader including a bottom wall and tabs extending vertically therefrom, said bottom wall having a plurality of openings formed therein for distributing water into the ground coffee basket and a top wall held by said tabs and spaced from and overlying said bottom wall and having an outwardly extending flange integrally formed therewith;
f. said overhanging hollow top wall of the coffeemaker housing including a generally vertical wall having an enlarged opening for receiving said spreader; and
g. the outwardly extending annular flange of the spreader being larger than the opening formed in the vertical wall of the outwardly extending overhanging wall so that the spreader may be suitably supported by the overhanging hollow top wall by simply positioning the main body portion of the spreader within the vertical wall until the outwardly extending annular flange of the spreader abuts an upper surface of the vertical wall of the overhanging wall.

5. An electric coffeemaker as defined in claim 3 wherein the spreader includes an integrally molded nipple that extends outwardly through a slot that is formed in the vertical wall of the overhanging wall of the housing for receiving heated water from said means for heating water.

* * * * *